UNITED STATES PATENT OFFICE.

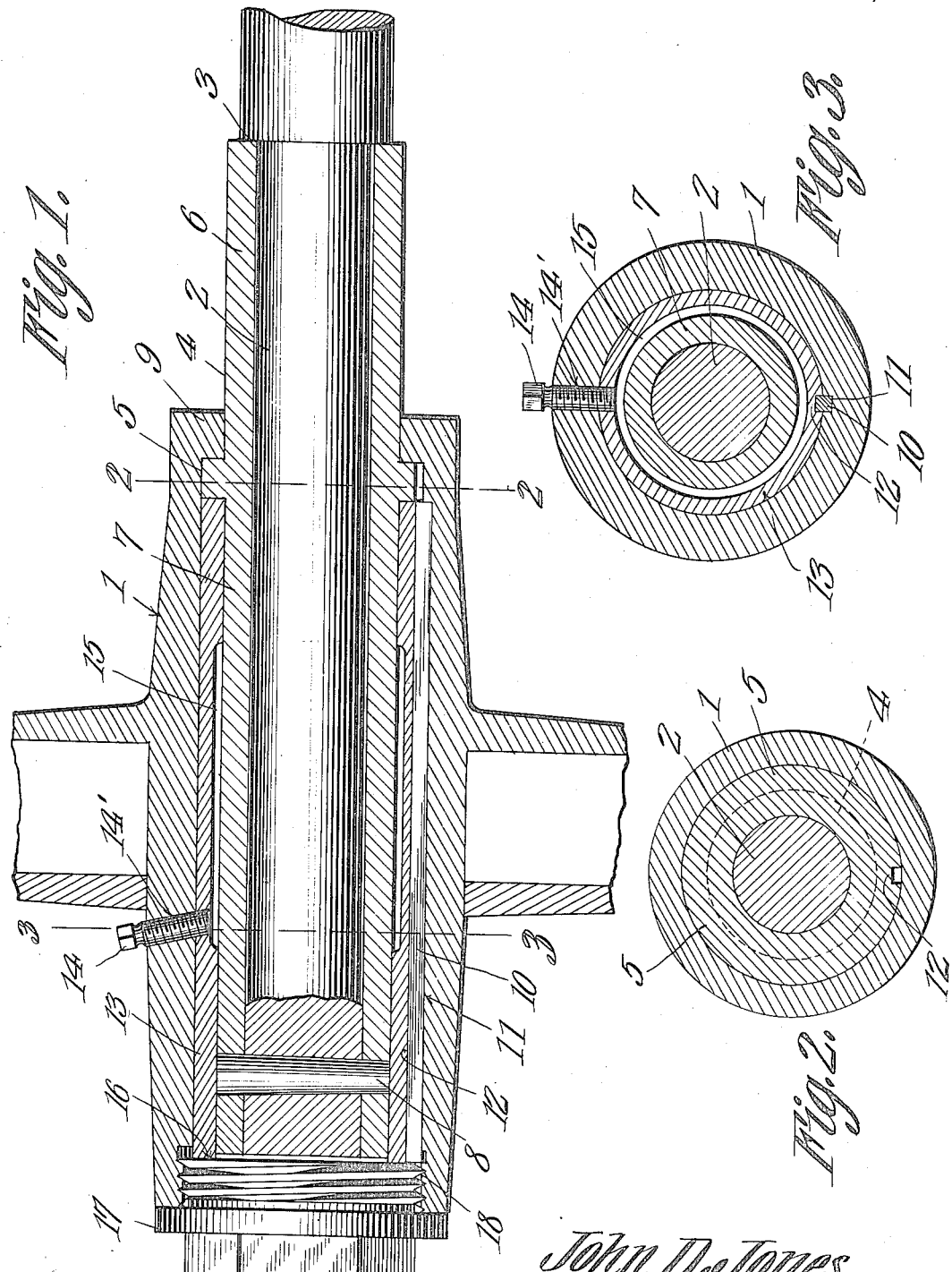

JOHN D. JONES, OF WALLA WALLA, WASHINGTON.

HUB.

1,045,298.   Specification of Letters Patent.   Patented Nov. 26, 1912.

Application filed February 3, 1912. Serial No. 675,161.

REISSUED

*To all whom it may concern:*

Be it known that I, JOHN D. JONES, a citizen of the United States, residing at Walla Walla, in the county of Walla Walla and State of Washington, have invented a new and useful Hub, of which the following is a specification.

The present invention relates to improvements in hubs, the primary object of the invention being the provision of a novel form of hub to be used in connection with vehicle spindles, the same being provided with means for sliding upon the spindle and to be retained thereon so as to reduce the wear upon the spindle and be provided with co-acting means to retain the hub upon such means and the spindle, such retaining means being carried by the hub or a sleeve adapted to be driven into a wooden hub when used in connection therewith.

A further object of the present invention is the provision of a novel form of hub bearing having primarily a main sleeve adapted to be placed upon an axle spindle of a vehicle and having an annular shoulder provided between its ends, the annular shoulder providing a means to prevent the outward displacement of the hub when in proper position, while means is carried by the hub in the outer end thereof to hold the hub in such position upon the spindle that the bearing will be made dust proof and any thrust of the hub and bearing will be taken care of.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a longitudinal sectional view through the hub and spindle carried bearing sleeve. Fig. 2 is a section taken on line 2—2 of Fig. 1. Fig. 3 is a section taken on line 3—3 of Fig. 1.

Referring to the drawings, the numeral 1 designates a wheel hub, and 2 is the spindle of the axle provided with the abrupt shoulder 3, which is a limiting means for the inner end of the skein 4. The skein 4 is provided with the intermediate annular shoulder 5, which divides the said skein into the short portion 6 and the long stationary bearing sleeve 7, the tapered pin 8 being disposed through the end of the sleeve 7 and the spindle 2 to fixedly secure the sleeve or member 4 upon the spindle.

In assembling this device, the short end 6 of the member 4 is first inserted within the hub 1 until the annular shoulder 5 abuts the projecting rim 9 of the hub, the skein 4 being now slid upon the reduced end of the spindle. The hub is now slid inwardly a sufficient distance to allow for the insertion of the pin 8. The axle box 13 is now slid within the hub and about the bearing surface 7, until its inner end is in abutting relation with the annular shoulder 5 upon the opposite side to the rim 9. The key 10 which fits within the opposed grooves 11 and 12, respectively of the hub 1 and bearing sleeve 13 retains the bearing sleeve 13 and hub against relative rotation, while the set screw 14 fitted within the threaded aperture 14' of the hub 1 and sleeve 13 retains the sleeve 13 against longitudinal movement, and also provides a lubricant directing means to the lubricant containing cavity 15. The outer end of the bearing sleeve 13 projects slightly beyond the outer ends of the sleeve 7 and spindle 2 and is adapted to be abutted by the inner end 16 of the dust excluding cap 17 which is fitted within the interiorly threaded end 18 of the hub 1.

What is claimed is:

1. The combination with an axle spindle and a hub, of a skein secured to the spindle, said skein having an integral annular shoulder between its ends, said hub being slidable upon the skein and provided with an internal annular projection abutting the shoulder of the skein to retain the hub against outward movement, an axle box carried by the hub and concentric with the skein, its inner end abutting the shoulder of the skein, and a dust excluding cap fitted in the end of the hub and locking the box against outward movement.

2. The combination with an axle spindle and a hub, of means for securing the hub upon the spindle, having a tubular member incasing the spindle and provided with an annular shoulder between its ends, one portion of said tubular member being a bearing sleeve, means for locking the tubular member upon the spindle, the hub being provided with an annular inwardly projecting shoulder surrounding the other portion of the tubular member and held against outward movement by the annular shoulder of the tubular member, an outer bearing sleeve longitudinally slidable within the hub and having its inner end abutting the opposite side of the annular shoulder of the tubular member, coacting means carried by the hub and outer bearing sleeve to prevent the sleeve from rotating independently of the hub, and a dust excluding and locking cap mounted in the outer end of the hub and retaining the outer bearing sleeve against longitudinal movement.

In testimony that I claim the foregoing as my own, I have hereto affixed my signature in the presence of two witnesses.

JOHN D. JONES.

Witnesses:
SELINA WILLSON,
ERNEST F. RILEY.